Patented Mar. 16, 1926.

1,576,550

UNITED STATES PATENT OFFICE.

WILLIAM F. ROCHOW, OF PITTSBURGH, PENNSYLVANIA, ASSIGNOR TO HARBISON-WALKER REFRACTORIES COMPANY, OF PITTSBURGH, PENNSYLVANIA, A CORPORATION OF PENNSYLVANIA.

REFRACTORY CEMENT COMPOSITION.

No Drawing.   Application filed August 26, 1921.   Serial No. 495,543.

*To all whom it may concern:*

Be it known that I, WILLIAM F. ROCHOW, a citizen of the United States, and a resident of Pittsburgh, in the county of Allegheny and State of Pennsylvania, have invented a new and useful Improvement in a Refractory Cement Composition, of which the following is a specification.

This invention relates to refractory cements. More particularly it relates to certain mixtures of dry materials, capable of forming a cement or mortar, upon the addition of water. The mortar is suitable for use in building walls of refractory bricks, and also for spreading over such walls in the form of a coating or plaster. A particular object of the invention is to provide a composition which may be formed by mixing together dry powdered materials, and which can be shipped in the dry state to the point of use, there to be made up into a mortar or a cement of the desired consistency simply by the addition of water.

Another object of the invention is to provide such a mixture in a form that may be shipped in the smallest possible space, and with all unnecessary weight eliminated.

Other uses and advantages of the material will be understood by those familiar with the art.

Heretofore fire clay and similar materials have been mixed with liquid sodium silicate to form a mortar or cement. The clay and other materials have been pulverized, and the sodium silicate has been added in liquid form, the resulting mixture being formed into a mortar or paste of desired consistency which has then been shipped in this semi-liquid form to the point of use in cans or barrels. This practice is objectionable because of the difficulty in handling semi-liquid material, the extra cost of transporting the water in the mixture, and for other reasons. In certain cases the insoluble materials have been shipped in dry form, and the sodium silicate in cans, in liquid form, the two to be mixed at the point of use to form a mortar. This is likewise objectionable because of the difficulty in handling and shipping a liquid, and the danger of not obtaining a uniform mixture of the clay in use.

The present invention consists in mixing in suitable proportions quartzite or silica rock, silica brick bats or calcined silica, highly refractory and plastic fire clay and sodium silicate in dry pulverized form. The quartzite, silica, brick and fire clay are ground together in suitable machinery, such as a dry pan or ring roll and passed through a screen to secure a fineness approximately 100% through 40 mesh screen. The dry sodium silicate is purchased in the market in the form of a powder, and is mixed in with the other ingredients, from five to twenty percent being used. The ingredients are carefully weighed and mixed in some such machine as a concrete mixer, in order to insure accuracy of mixing and uniformity throughout. This dry mixture is then put in air-tight containers, such as cans, barrels or paper bags suitably treated with some protecting medium such as paraffine, tar or the like. Sacks are much preferred on account of the ease in handling and the fact that they do not need to be returned by the consumer. It is necessary that the containers be practically air-tight, because the dry material tends to deteriorate when exposed to the air.

When a suitable amount of water is added to this dry mixture, the mortar which will be formed may be used in laying refractory brick, or as a daubing or coating mixture applied to the surface of the refractory brick work. When carefully mixed the material will begin to set in a few hours, and when dried out is very hard, making solid walls. The cement has great strength after drying, and especially after heat is applied. In many cases this strength is greater than the brick itself, and upon breaking, the brick will break through before the cement joint, and it retains its full strength up to a heat approximating its melting point.

Ordinarily when laying fire brick or silica brick, ground fire clay or quartzite and fire clay are used. But with this material alone the mortar has very little bond or strength until after it has been heated up to a very high temperature, say 2500° Fahrenheit. The fact that such joints are weak makes them porous and allows gases and molten metals to penetrate the joints and thus to attack the brick work. The special refractory cement or cement herein referred to makes a vastly superior bond, resulting in a hard, dense joint.

The chemical composition of the mixture herein disclosed is acid, but it can be used to advantage in almost all furnaces where fire clay or silica brick are used.

I claim:

A dry powdered refractory cement composition consisting of silica, fire clay, calcined silica, and from 5 to 20% of sodium silicate.

In testimony whereof, I sign my name.

WILLIAM F. ROCHOW.